United States Patent
Miller

(10) Patent No.: US 12,179,711 B2
(45) Date of Patent: Dec. 31, 2024

(54) LOCKING RELEASE LEVER FOR SECURING A BICYCLE ON A BICYCLE RACK

(71) Applicant: Joel W Miller, Bend, OR (US)

(72) Inventor: Joel W Miller, Bend, OR (US)

(73) Assignee: Joel W Miller, Bend, OR (US)

( * ) Notice: Subject to any disclaimer, the term of this patent is extended or adjusted under 35 U.S.C. 154(b) by 139 days.

(21) Appl. No.: 18/134,320

(22) Filed: Apr. 13, 2023

(65) Prior Publication Data

US 2024/0343203 A1 Oct. 17, 2024

(51) Int. Cl.
  *B60R 9/10* (2006.01)
  *B60R 9/06* (2006.01)

(52) U.S. Cl.
  CPC ................. *B60R 9/10* (2013.01); *B60R 9/06* (2013.01); *B60Y 2304/076* (2013.01)

(58) Field of Classification Search
  CPC ............. B60Y 2304/076; B60R 9/042; Y10S 224/924
  See application file for complete search history.

(56) References Cited

U.S. PATENT DOCUMENTS

| | | | |
|---|---|---|---|
| 5,195,670 A | 3/1993 | Piretti et al. | |
| 6,494,351 B1 * | 12/2002 | Dean | B60R 9/048 224/924 |
| 6,892,913 B1 | 5/2005 | Andersson | |
| 8,011,543 B2 | 9/2011 | Premartin et al. | |
| 9,956,922 B2 | 5/2018 | Phillips | |
| 10,065,568 B2 | 9/2018 | Phillips | |
| 10,086,769 B1 | 10/2018 | Phillips | |
| 10,150,424 B1 * | 12/2018 | Phillips | B60R 9/04 |

(Continued)

FOREIGN PATENT DOCUMENTS

| | | |
|---|---|---|
| CN | 102837761 A | 12/2012 |
| DE | 3932178 A1 | 4/1991 |

(Continued)

OTHER PUBLICATIONS

"1UP2" Heavy & Super Duty, (a product manual), apparently published by 1UP USA, accessed at 1UP USA website at https://www.1up-usa.com/wp-content/uploads/2016/06/2-HEAVY-SUPER-DUTY-SLOTTED.pdf on Mar. 21, 2023.

*Primary Examiner* — Brian D Nash
(74) *Attorney, Agent, or Firm* — Law Office of Karen Dana Oster, LLC

(57) ABSTRACT

A locking release lever for engaging or disengaging a bicycle rack ratcheting mechanism. The ratcheting mechanism for securing a bicycle on a bike rack when engaged and for freeing the bicycle when disengaged. A locking release lever includes (1) an anchor fixedly secured to the ratcheting mechanism (2) a swing lever with first and second ends, the first end connected or integral with the anchor, the swing lever for swinging between a first position for engaging the ratcheting mechanism and a second position for disengaging the ratcheting mechanism, and (3) a lock connected or integral with the second end of the swing lever, the lock including a bolt for being engaged when the swing lever is in the first position, the engaged bolt extending from the lock and preventing the swing lever from disengaging the ratcheting mechanism.

20 Claims, 9 Drawing Sheets

(56) References Cited

U.S. PATENT DOCUMENTS

| | | | |
|---|---|---|---|
| 2003/0071097 A1* | 4/2003 | Dean | B62H 3/10 224/924 |
| 2004/0084491 A1* | 5/2004 | Gibson | B60P 3/122 224/403 |
| 2007/0007316 A1* | 1/2007 | Witczak | B60R 9/042 224/310 |
| 2008/0006663 A1* | 1/2008 | Bergerhoff | B60R 9/10 224/400 |
| 2008/0099522 A1* | 5/2008 | Clausen | B60R 9/06 224/519 |
| 2018/0015885 A1* | 1/2018 | Flaherty | B60R 9/045 |
| 2018/0201202 A1* | 7/2018 | Phillips | B60R 9/10 |
| 2018/0265014 A1* | 9/2018 | Phillips | B62H 3/12 |
| 2018/0290601 A1* | 10/2018 | Phillips | E05B 57/00 |
| 2018/0354428 A1 | 12/2018 | Phillips | |
| 2022/0324390 A1* | 10/2022 | Hudswell | B60R 9/042 |

FOREIGN PATENT DOCUMENTS

| | | |
|---|---|---|
| JP | 2006347248 A | 12/2006 |
| JP | 2015160503 A | 9/2015 |

\* cited by examiner

LOCKING RELEASE LEVER FOR SECURING A BICYCLE ON A BICYCLE RACK

TECHNICAL FIELD

Embodiments relate to a locking release lever for a bicycle on a bicycle rack. Particular embodiments relate to a locking release lever for a bicycle on a bicycle rack with a cam lock that secures a ratcheting mechanism.

BACKGROUND

Some types of vehicle-mounted bicycle racks have arms that can be moved between a open position in which the bicycle may be freely lifted from the bicycle rack and a closed position in which the bicycle is held in place by the arms. Among these types of bicycles racks, some include a ratcheting mechanism that when engaged allows the arms to move from the open position to the closed position, but not from the closed position to the open position. In order to move the arms from the closed position to the open position, the ratcheting mechanism must be disengaged.

One example of this latter type of bicycle rack is the 1UP bicycle rack which is sold by 1UP USAR. Details of the parts, features, and operation of a 1UP bicycle rack are described in "1UP 2 HEAVY & SUPER DUTY," published by 1UP USA®, which is incorporated by reference in its entirety. In the 1UP bicycle racks, the ratcheting mechanism can be disengaged with a lever. One issue with the above type of bicycle rack is security. For example, the above-described 1UP bicycle rack has no security that prevents removal of the bicycle from the bicycle rack.

SUMMARY

The following summary introduces at a high level a limited number of topics described in the Detailed Description. This summary is not intended to identify key or essential features and should not be used for that purpose. In addition, this summary is not intended to be used as a guide to the scope of the claims. Instead, this summary is provided as an introduction for the reader.

Some embodiments provide a locking release lever for at least one of engaging or disengaging a ratcheting mechanism of a bicycle rack, the ratcheting mechanism configured for securing a bicycle on the bicycle rack when engaged and for freeing the bicycle when disengaged. The locking release lever includes an anchor that is fixedly secured to the ratcheting mechanism of the bicycle rack.

The locking release lever further includes a swing lever with a first end and a second end, the first end being at least one of connected with or integral with the anchor, the swing lever configured to be swung between a first position which causes to the ratcheting mechanism to be engaged and a second position which causes the ratcheting mechanism to be disengaged; and The locking release lever further includes a lock at least one of connected with or integral with the second end of the swing lever, the lock including a bolt, the lock configured for being locked when the swing lever is in the first position, the bolt of the locked lock extending from the lock and preventing the swing lever from moving into the second position and disengaging the ratchet mechanism.

A BRIEF DESCRIPTION OF THE DRAWINGS

Various embodiments are described below with reference to drawings which are now summarized. It should be noted that these drawings are not necessarily to scale. In addition, the drawings are simplified to avoid obscuring important principles with unnecessary details.

DETAILED DESCRIPTION

Some embodiments are now described with reference to the above-described figures. In the following description, multiple references are often made to "some embodiments." These references to "some embodiments" are not necessarily referring to the same embodiments, as numerous and varied embodiments are possible. No effort is made to describe all possible embodiments. Sufficient embodiments are described so that those skilled in the art will become appraised of the relevant principles. In addition, disclosed embodiments are not necessarily preferred or advantageous over other embodiments.

In this document, reference is made to one or more vertical axes and to one or more horizontal axes. These axes should be understood as being substantially vertical or substantial horizontal, where substantially vertical means within at least 25 degrees of true vertical and substantially horizontal means within at least 25 degrees of true horizontal. The phrases "substantially vertical" and "substantially horizontal" may also be used and again substantially vertical means within at least 25 degrees of true vertical and substantially horizontal means within at least 25 degrees of true horizontal. Similarly, "substantially perpendicular" to something means within at least 25 degrees of true perpendicular.

With some types of vehicle-mounted bicycle racks, a bicycle is mounted on a support tray. The vehicle-mounted bicycle rack may have holding arms that a user can move into an open position in which the bicycle may be freely lifted from the bicycle rack and off the support tray and a closed position in which the bicycle is held in place on the bicycle rack by the holding arms. Among these types of bicycles racks, some include a ratcheting mechanism that when engaged allows the holding arms to move from the open position to the closed position, but not from the closed position to the open position. In order to move the arms from the closed position to the open position, the ratcheting mechanism must be disengaged with a release lever. However, in at least many implementations, there is no security to prevent a thief from disengaging the ratcheting mechanism, moving the holding arms into the open position, and stealing the bicycle.

Embodiments described herein provide a locking release lever that is installed on the bicycle rack to replace a non-locking release lever. In some embodiments the purpose of the locking release lever is provide, when the lock of the locking release lever is activated, a security feature to prevent the ratcheting mechanism from being disengaged. That in turn prevents the holding arms from being moved into the open position. This prevents the bicycle in the bicycle rack from being removed from the rack. In some further embodiments, the bicycle rack is a 1UP bicycle rack manufactured by 1UP USAR.

Figure 1:
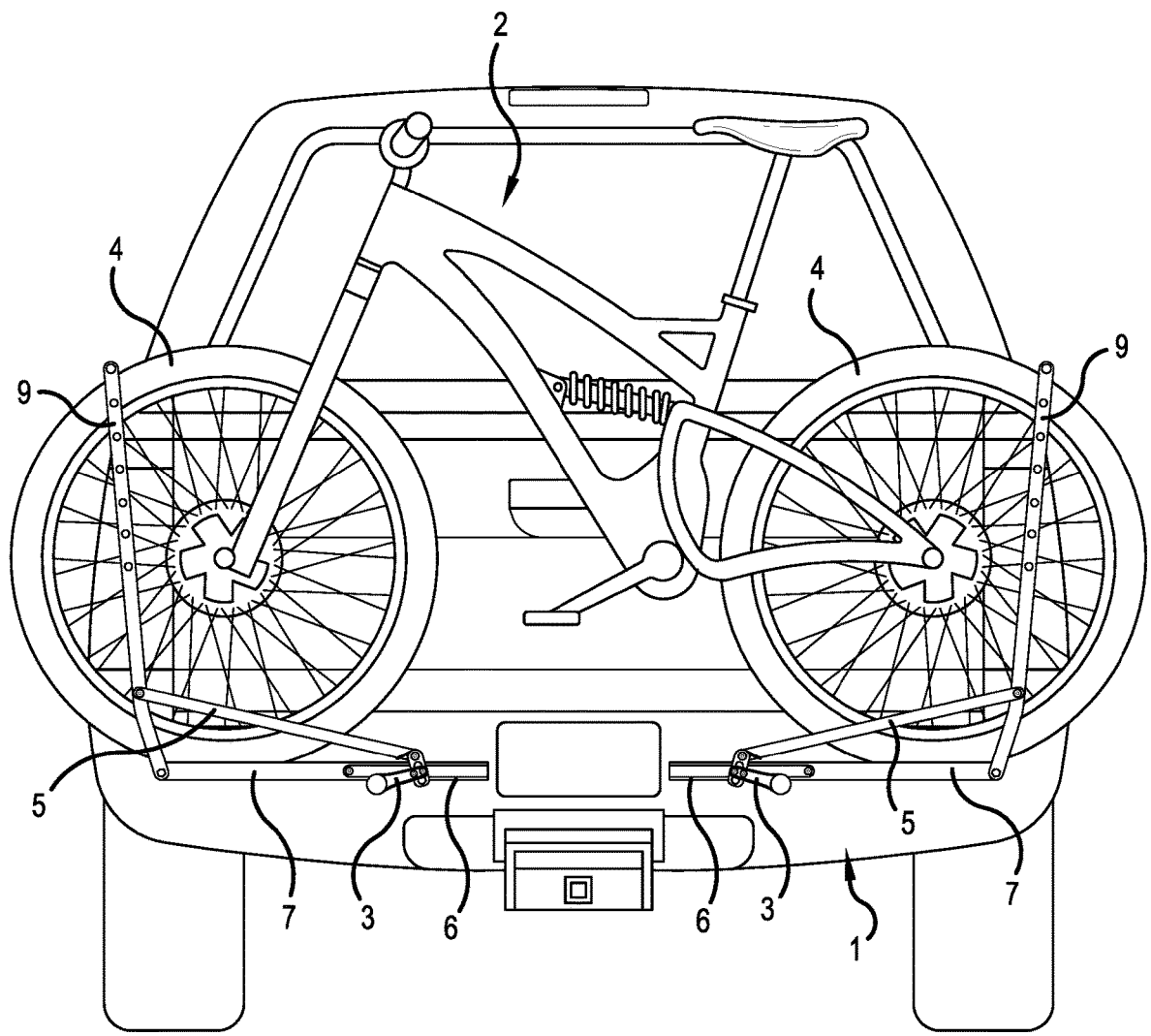
FIG. 1 is a perspective drawing of a bicycle rack with a locking release lever, consistent with some embodiments.
Figure 2:
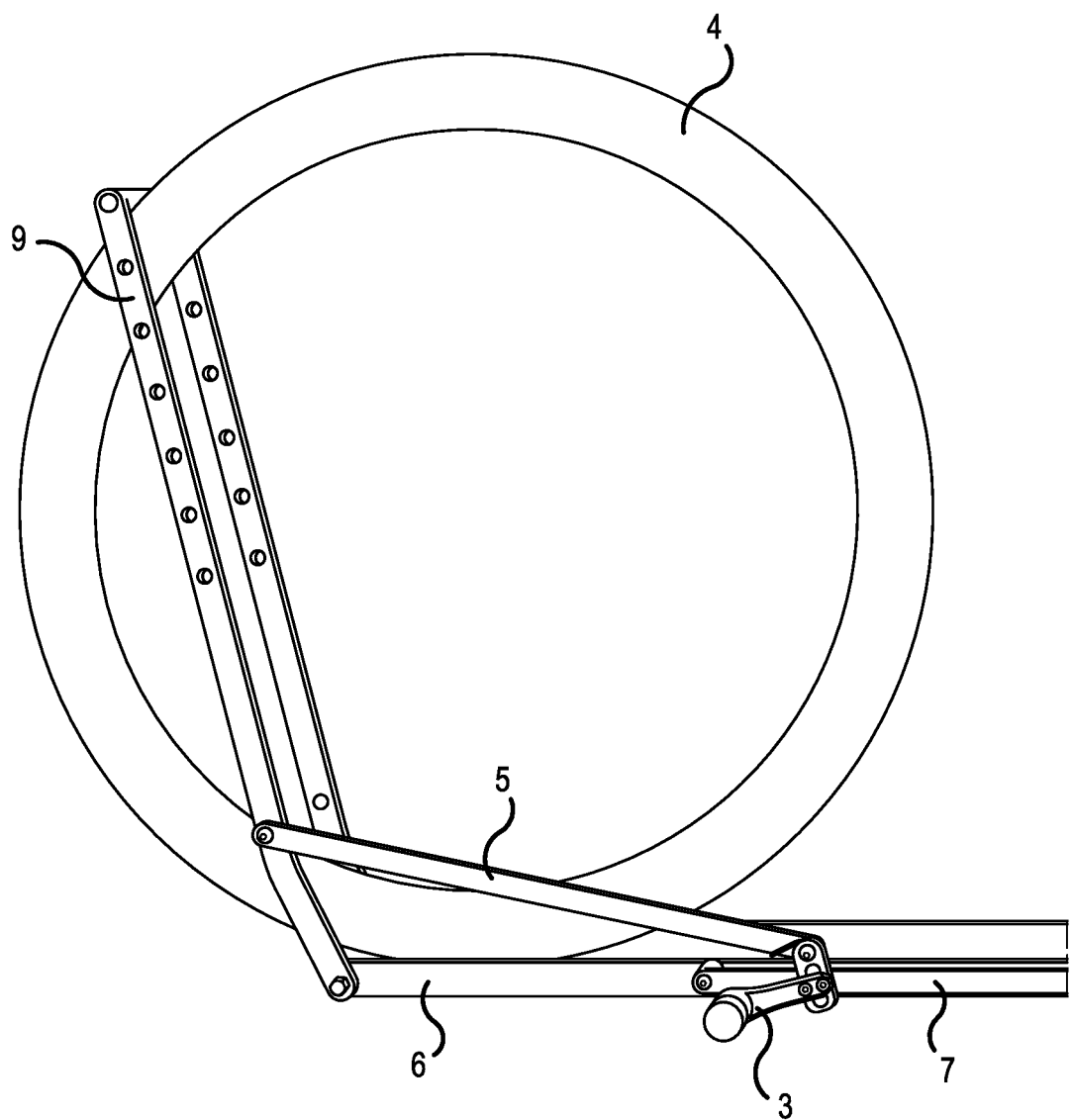
FIG. 2 is a perspective drawing of a portion of the bicycle rack of FIG. 1, showing a portion of the bicycle rack in greater detail, including a holding arm in a closed position securing a bicycle tire and the locking release lever in a locked position preventing movement of the holding arms, consistent with some embodiments. The bicycle tire is shown simplified compared to FIG. 1.

Referencing FIGS. 1 and 2, an exemplary environment in which an exemplary locking release lever 3 operates is shown at a high level. As shown, a bicycle 2 is supported in a bicycle rack 1 with a locking release lever 3. More specifically, the bicycle 2 rests with its tires 4 supported on a support tray 6 of the bicycle rack 1. The tires are held in place by two holding arms 9 which are connected to respective control arms 5 which are connected to ratchet arms 7. The holding arms 9 are shown in a closed position in which the holding arms 9 are positioned against the tires 4 preventing the tires 4 (and the bicycle 2) from being lifted off of the support tray 6 and thus out of the bicycle rack 1 (in contrast, see a holding arm in an open position in FIG. 6C). As is discussed in further detail below, when the locking release levers 3 are in a first position, they act on the ratchet arms 7 and the control arms 5 to prevent the holding arms 9 from being moved out of the closed position.

Turning to specifically reference FIG. 2, a portion of the bicycle rack of FIG. 1 is illustrated in greater detail, including a holding arm 9 in a closed position securing a bicycle tire 4. The locking release lever 3 in a first position preventing movement of the holding arms 9, consistent with some embodiments. If both holding arms 9 are locked in this closed position, the bicycle 2 cannot be removed from the bicycle rack 1. The bicycle tire is shown simplified compared to FIG. 1.

Figure 3A:
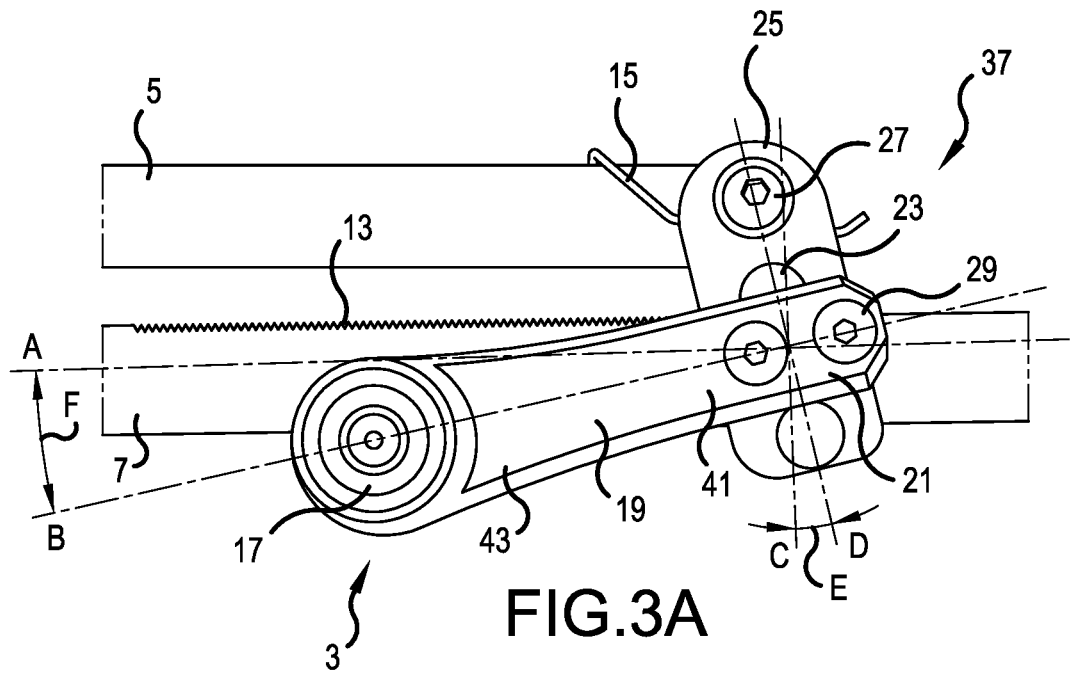
FIGS. 3A and 3B are perspective drawings of a portion of the bicycle rack of FIG. 1, showing various components in two different configurations, consistent with some embodiments. The components include a locking release lever and a ratcheting mechanism.
Figure 3B:
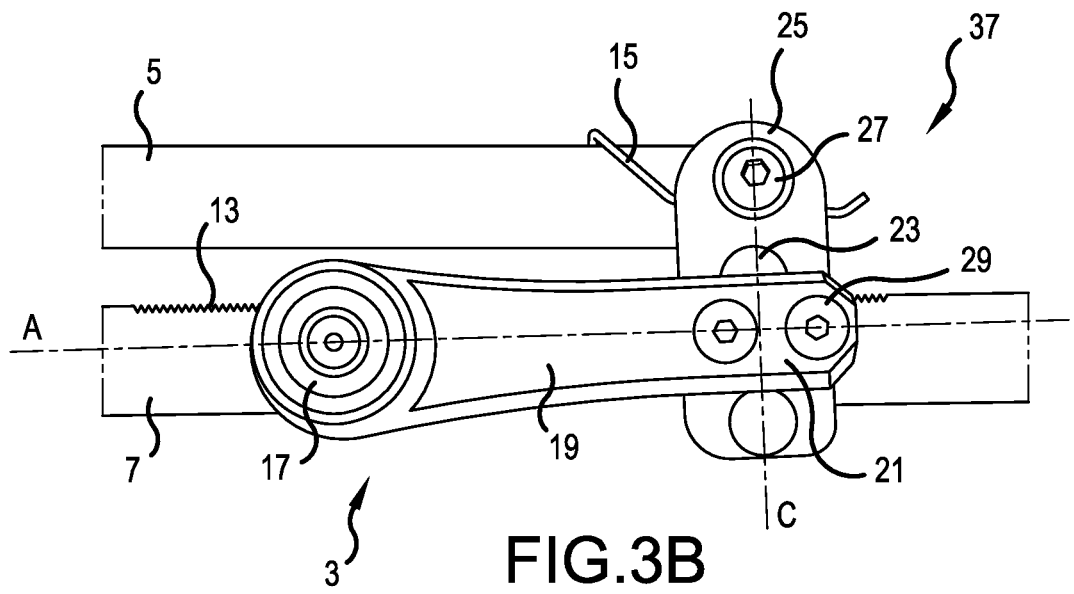

Referencing FIGS. 3A-3B, 4A-4B, and 5A-5C, the exemplary locking release lever 3 is shown in greater detail. As is discussed further below, FIG. 3A shows the locking release lever 3 in a first position and FIG. 3B shows the locking release lever 3 in a second position. When the locking release lever 3 is in the first position as shown in FIG. 3A, this prevents the holding arms 9 from being moved from a closed position to an open position. And when the locking release lever 3 is in the second position as shown in FIG. 3B, this allows the holding arms 9 to be moved from the closed position to the open position.

A locking release lever 3 includes a cam lock 17 (with bolt 31 shown extended in FIG. 4B), a swing lever 19, and an anchor 21 (although a cam lock is illustrated, other types of locks may be used). The anchor 21 is fixedly secured (to prevent rotation) to a ratchet frame 25 by connectors 29 (for example with tamper-proof fastening devices such as screws). Ratchet frame 25 includes a ratchet pin 23 (head of pin shown) for engaging ratchet teeth 13 of ratchet arm 7. Ratchet frame 25 is loosely coupled (to allow for rotation and/or positional movement) with ratchet arm 7 and with control arm 5 at least partly with connectors 27 (e.g. rivets, bolts, etc.).

Referencing FIG. 3A locking release lever 3 defines a longitudinal axis B that intersects with an at least substantially horizontal axis A to define an included angle F. This is the first position of the locking release lever 3. That is, when the locking release lever 3 is positioned (e.g. by a user) substantially (within 25 degrees) of angle F, then locking release lever is in the first position. As is discussed further below, this first position keeps the ratchet pin 23 in engagement with the ratchet teeth 13 and prevents movement of the holding arms 9 from a closed position to an open position.

Further referencing FIG. 3A, when the locking release lever 3 is in the first position, it allows a bias spring 15 to exert a bias. Discussing this in further detail, the bias spring 15 (partially shown) is coupled with ratchet frame 25 and with control arm 5 and configured to exert a bias that causes ratchet frame 25 to rotate or shift so that the ratchet pin 23 is engaged with the ratchet teeth 13. As can be seen in FIG. 3A, the ratchet frame 25 defines a longitudinal axis D that intersects with an at least substantially vertical axis C (substantially vertical with respect to the substantially horizontal axis A) to define an included angle E. Angle E is referred to as a bias angle because it is the amount by which the slope of longitudinal axis D is biased from the at least substantially vertical axis C. When the bias spring 15 biases the ratchet frame 25 into the bias angle E, then ratchet pin 23 is positioned to engage the ratchet teeth 13 of ratchet arm 5. This prevents the holding arms 9 from being moved from a closed position to an open position.

Figure 4A:
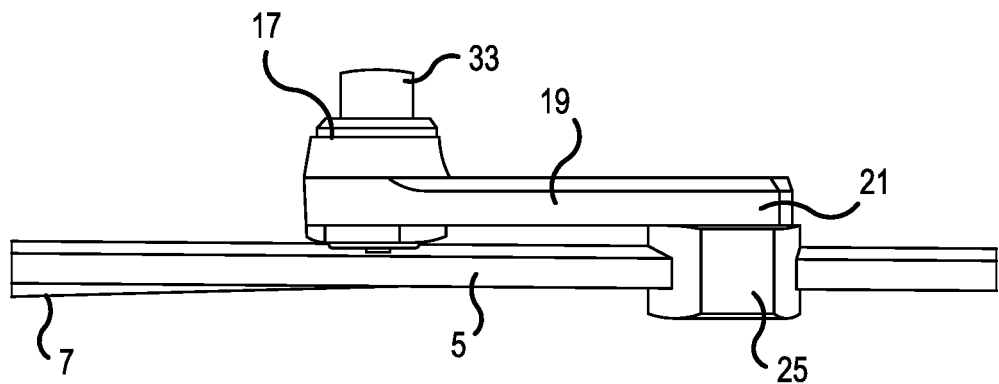
FIG. 4A is a top view of a locking release lever attached to a racketing mechanism, consistent with some embodiments, showing when the lock with a button when the lock is not engaged.
Figure 4B:
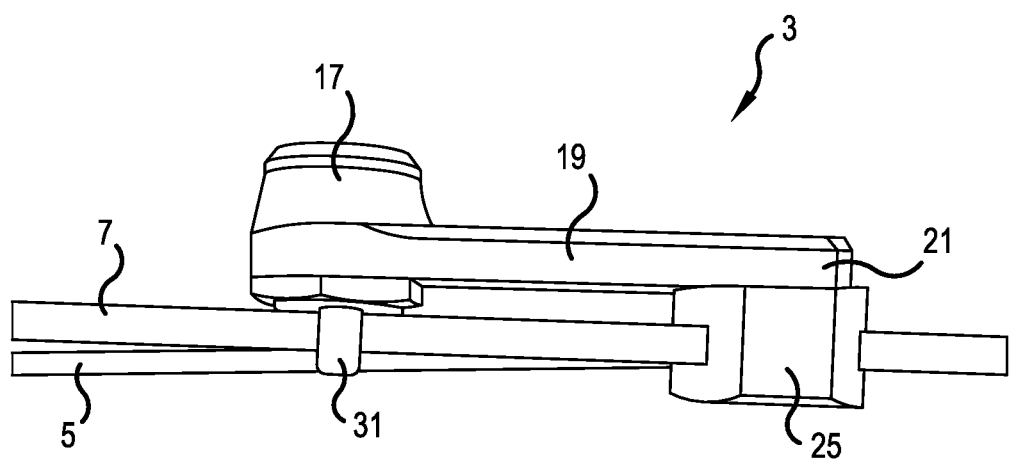
FIG. 4B is a bottom view of the locking release lever of FIG. 4A, showing the lock engaged with a bolt of the locking release lever positioned against a ratcheting arm of the ratcheting mechanism, consistent with some embodiments.
Figure 5A:
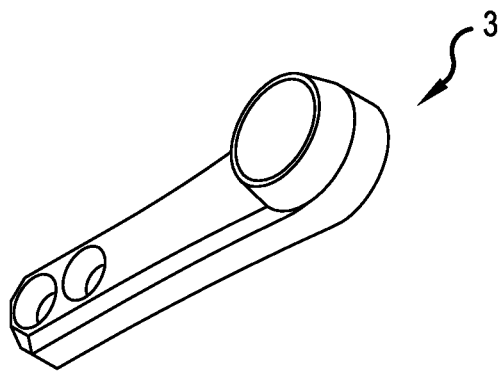
FIG. 5A is a perspective view of a simplified locking release lever, consistent with some embodiments.
Figures 5B, 5C:
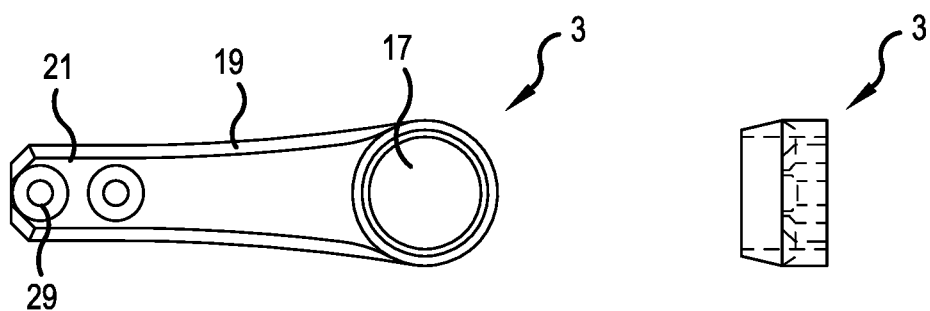
FIG. 5B is a side view of the simplified locking release lever of FIG. 5B, consistent with some embodiments.
FIG. 5C is an end view of the simplified locking release lever of FIG. 5A, consistent with some embodiments.
Figure 5D:
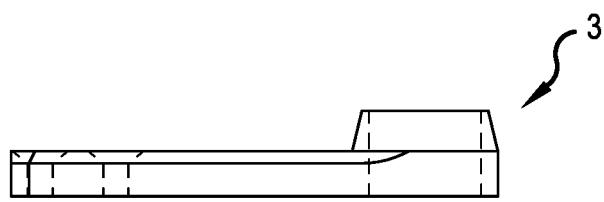
FIG. 5D is a top view of the simplified locking release lever of FIG. 5A, consistent with some embodiments.

However, referencing FIG. 3B, a user may grip the locking release lever 3, which is fixedly secured to ratchet frame 25, and moves it so that the longitudinal axis B of the locking release lever 3 is on the at least substantially horizontal axis A (longitudinal axis B therefore not shown in FIG. 3B). This is the second position of the locking release lever 3. To place the locking release lever 3 in this second position, the user must overcome the bias of the bias spring 15. When the locking release lever 3 is moved into the second position, the ratcheting frame 25 is also moved so that the longitudinal axis D of the ratcheting frame 25 aligns with the at least substantially vertical axis C (longitudinal axis D is therefore not shown in FIG. 3B). When the locking release lever 3 and the ratchet frame 25 are placed in this configuration, the ratchet pin 23 is disengaged from the ratchet teeth 13. In moving the Returning to the locking release lever 3 with reference to FIGS. 4A and 4B, FIG. 4A shows a top view of the lock when not engaged and FIG. 4B shows a bottom view of the lock when engaged. As can be seen in FIG. 4B, when the cam lock 17 is locked, a bolt 31 extends from cam lock 17 and engages against ratchet arm 7. With the bolt 31 in this position, the locking release lever 3 is kept from being moved out of the first position. Consistent with the above discussion, that prevents theft of the bicycle 2 that is secured on the bicycle rack 1. Referencing FIG. 4A, consistent with some embodiments, a button is shown. Referencing FIG. 4B, the button has been pushed and is no longer visible. Instead, bolt 31 is shown engaged, a consequence of the pushing of button 33. To retract bolt 31, a key is required. In alternatives embodiments, a key is also used to engage bolt 31.

Consistent with some embodiments, a ratcheting mechanism 37 includes at least one or more ratchet frame 25, ratchet arm 7, ratchet teeth 13, bias spring 15, ratchet pin 23, and connectors 27 and 29.

Figure 6A:
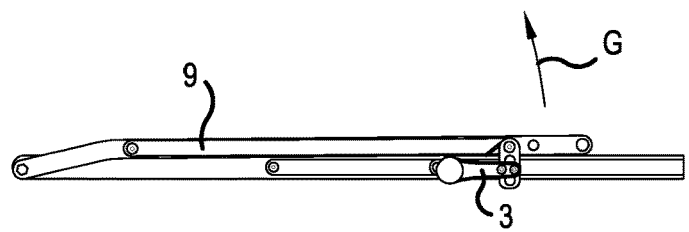
FIGS. 6A-6C show various positions of a holding arm with FIG. 6A showing a closed position, FIG. 6B showing a more open position, and FIG. 6C showing a fully open position, consistent with some embodiments.
Figure 6B:
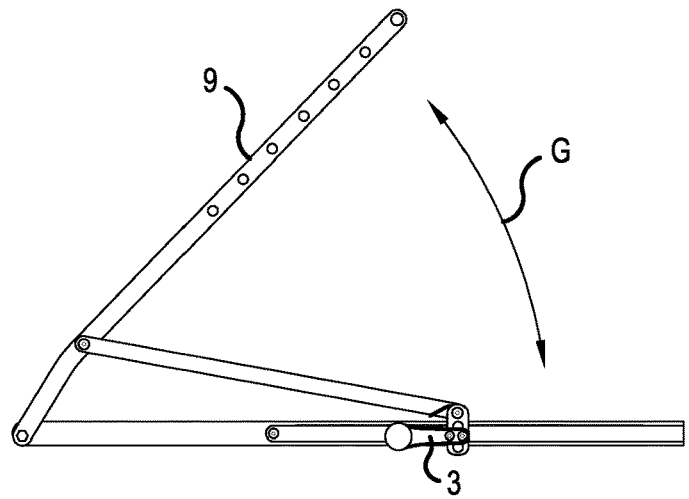
Figure 6C:
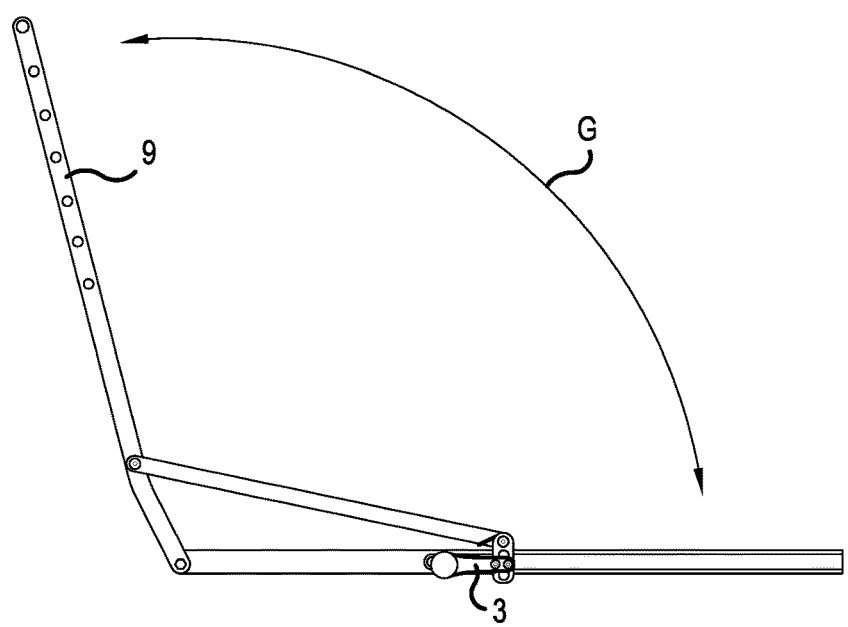

Operation of the holding arms 9 is now described relative to FIGS. 6A-6C. Referencing FIG. 6A, the holding arms 9 are shown in a folded position. This position could be used for storage of the bicycle rack. The locking release lever 3 is shown in the second position in which the ratchet pin 23 does not engage the rachet teeth 13 and the holding arms 9 are free to move from the open position to the closed position and from the closed position to the open position. Referencing FIG. 6B, the holding arms 9 are shown in an intermediate position that is roughly halfway between a folded position and an open position. The reach this intermediate position, the holding arms 9 moved about arc G, as shown. Referencing FIG. 6C, the holding arms are shown in a open position, having moved further along arc G, as shown.

Figure 7A:
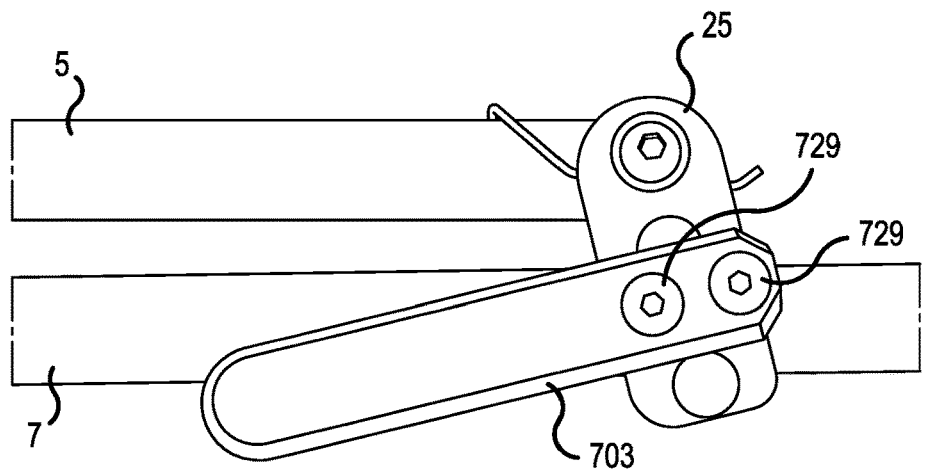
FIGS. 7A-7C illustrate a method of installing a locking release lever, with FIG. 7A showing a ratcheting mechanism with an attached non-locking release lever, FIG. 7B showing the ratcheting mechanism with the non-locking release lever removed, and FIG. 7C showing the ratcheting mechanism with an attached locking release lever, consistent with some embodiments.
Figure 7B:
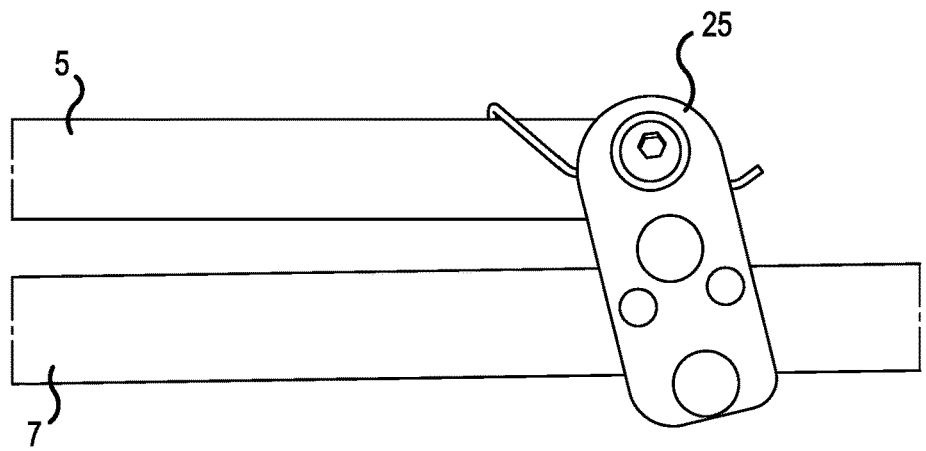
Figure 7C:
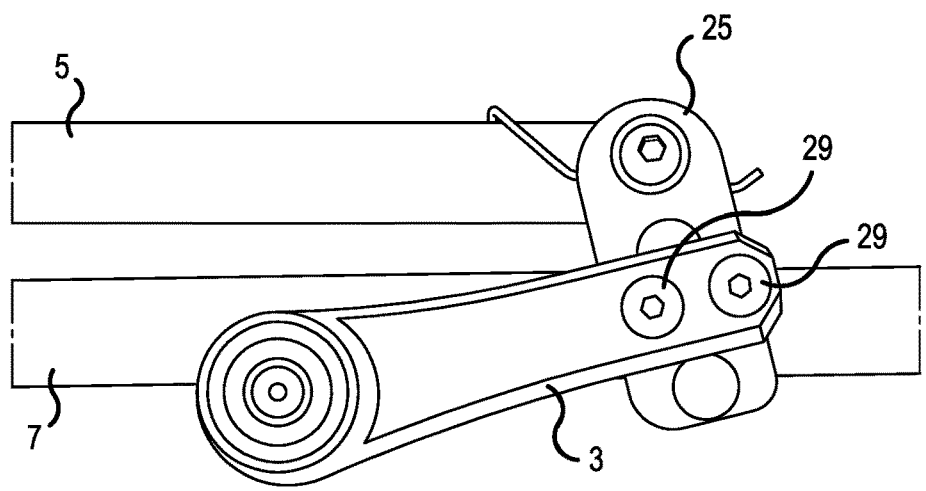

Referencing FIGS. 7A-7C, a method of installing a locking release lever 3 is illustrated. In FIG. 7A, a bicycle rack is equipped with a non-locking release lever 703. The non-locking release lever 703 is attached to the ratchet frame 25 with ordinary fastening devices 729. In FIG. 7B, the non-locking release 703 has been removed exposing the ratchet frame 25. In FIG. 7C, the locking release lever 3 has been secured to the ratchet frame 25 via connectors 29, which in some embodiments are tamper proof fastening devices, such as for example, stainless steel, tamper-proof screws.

Figure 8:
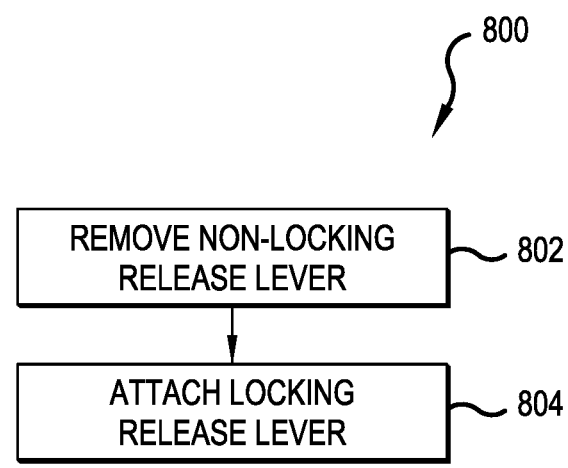
FIG. 8 is a flow diagram illustrating a method of installing a locking release lever, consistent with some embodiments.

Referencing FIG. 8, a flow chart illustrates a method 800 of installing a locking release lever 3. In process block 802, a non-locking release lever is removed from a bicycle frame. In process block 804, a locking release lever is installed.

Figure 9:
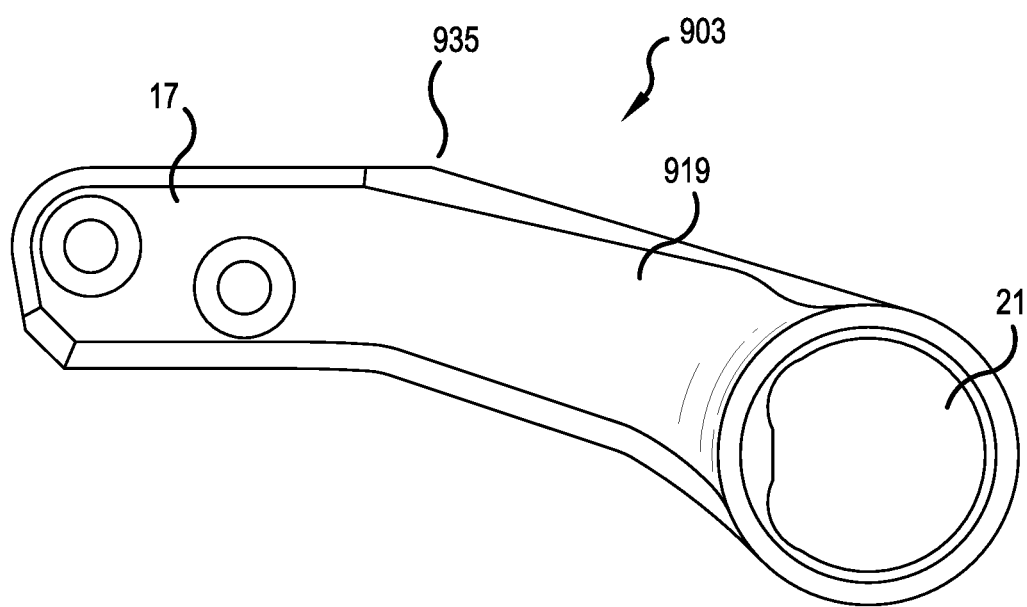
FIG. 9 is a two-dimensional drawing of an alternative embodiment of a locking release lever, showing a swing lever with a partially bent shape.

Referencing FIG. 9, an alternative embodiment of a locking release lever 903 is shown with an anchor 17, a cam lock 21, and an alternative version of a swing lever 919, which has a bend 935.

Some embodiments are now discussed. 1.
Embodiment 1: A locking release lever (e.g. locking release lever 3) for at least one or engaging or disengaging a ratcheting mechanism (e.g. ratcheting mechanism 37) of a bicycle rack (e.g. engaging with locking release lever 3 if a first position and disengaging with locking release lever in the second position), the ratcheting mechanism configured for securing a bicycle (e.g. bicycle 2) on the bicycle rack (e.g. bicycle rack 1) when engaged (e.g. with holding arms 9 in secured in a closed position) and for freeing the bicycle when disengaged (e.g. with holding arms 9 in an open position), the locking release lever including at least:
an anchor (e.g. anchor 21) that is fixedly secured to the ratcheting mechanism of the bicycle rack;
a swing lever (e.g. swing lever 19) with a first end (e.g. first end 41) and a second end (e.g. second end 43), the first end being at least one of connected with or integral with the anchor, the swing lever configured to be swung between a first position which causes to the ratcheting mechanism to be engaged and a second position which causes the ratcheting mechanism to be disengaged; and
a lock (e.g. cam lock 17) at least one of connected with or integral with a second end of the swing lever, the lock including a bolt (e.g. bolt 31), the lock configured for being locked when the swing lever is in the first position, the bolt of the locked lock extending from the lock and preventing the swing lever from moving into the second position and disengaging the ratchet mechanism.

Embodiment 2: The locking release lever of embodiment 1, wherein when the swing lever engages the ratcheting mechanism one or more movements of one or more holding arms (e.g. holding arms 9) associated with the bicycle rack are restricted to movement in one direction and wherein when the swing lever disengages the ratcheting mechanism the one or more movements of the one or more holding arms associated with the bicycle rack are freed for movement in at least two directions.

Embodiment 3: The locking release lever of any of embodiments 1 or 2, wherein the swing lever is configured, when moved into the first position, to at least one of cause or allow a pin (e.g. ratchet pin 23) associated with the ratcheting mechanism to engage one or more teeth (e.g. ratchet teeth 13) of a ratcheting arm (e.g. ratchet arm 7) that is associated with the ratcheting mechanism; and
wherein the swing lever is further configured, when moved into the second position, to cause the pin to at least partially disengage from the one or more teeth.

Embodiment 4: The locking release lever of embodiment 3, wherein the anchor is fixedly secured to a frame (e.g. ratchet frame 25) of the ratcheting mechanism; and
wherein the swing lever is configured, when moved into the first position, to at least one of cause or allow a longitudinal axis associated with the frame to be at a bias angle (e.g. bias angle E) relative to an at least substantially vertical axis, and wherein placing the longitudinal axis associated with the frame in the bias angle moves the pin toward engagement with the teeth, and wherein the at least substantially vertical axis is at least substantially perpendicular to a longitudinal axis (e.g. longitudinal axis B) of the ratcheting arm.

Embodiment 5: The locking release lever of embodiment 4, wherein the swing lever is configured, when moved into the first position, to allow a bias spring (e.g. bias spring 15) to bias the frame into the bias angle.

Embodiment 6: The locking release lever of any of embodiments 3-5, wherein the anchor is fixedly secured to a frame of the ratcheting mechanism; and
wherein the swing lever is configured, when moved into the second position, to cause a longitudinal axis associated with the frame at be in at least substantially vertical orientation and wherein placing the longitudinal axis associated with the frame in the at least substantially vertical orientation moves the pin away from engagement with the teeth, wherein the at least substantially vertical orientation is at least substantially perpendicular to an at least substantially horizontal axis defined by the ratcheting arm.

Embodiment 7: The locking release lever of embodiment 6, wherein the swing lever is configured, when moved into the second position to overcome resistance from a bias spring that biases the frame into the bias angle.

Embodiment 8: The locking release lever of any of embodiments 1-7, wherein the lock is a camlock.

Embodiment 9: The locking release lever of embodiment 8, wherein the camlock is configured to be locked with at least a button (e.g. button 33).

Embodiment 10: The locking release lever of any of embodiments 1-9, wherein the lock is configured for being locked when the swing lever is in the first position with the bolt extended to engage a ratchet arm of the ratcheting mechanism, the engagement of the bolt with the ratcheting arm preventing the swing arm from moving to the second position to disengage the ratcheting mechanism.

Embodiment 11: The locking release lever of any of embodiments 1-10, wherein the anchor is connected with the ratcheting mechanism at least in part with one or more fastening devices (e.g. connectors 29).

Embodiment 12: The locking release lever of embodiment 11, wherein the one or more fastening devices include at least two or more tamper-proof screws (e.g. connectors 29).

Embodiment 13: The locking release lever of any of embodiments 1-12, wherein the anchor is connected with the ratcheting mechanism by being integral with the ratcheting mechanism.

Embodiment 14: The locking release lever of any of embodiments 1-13, wherein the swing lever is substantially straight between the first end and the second end.

Embodiment 15: The locking release lever of any of claims 1-14, wherein the swing lever with a first end and a second end, the first end being at least one of connected with or integral with the anchor, the swing lever configured to be swung between a first position which causes to the ratcheting mechanism to be engaged and a second position which causes the ratcheting mechanism to be disengaged comprises:

wherein when the ratcheting mechanism is engaged one or more holding arms associated with the bicycle rack are prevented from being moved out of a closed position which secures the bicycle to the bicycle rack; and wherein when the ratcheting mechanism is disengaged the one or more holding arms are freed for movement out of the closed position and to an open position in which the bicycle may be removed from the bicycle rack.

Embodiment 16: The locking release lever of any of embodiments 1-5, wherein the first end of the swing lever is connected with the ratcheting mechanism of a bicycle rack that is a 1UP bicycle rack produced by 1UP USA®.

Embodiment 17: A method of converting a ratcheting mechanism of a bicycle rack from a first configuration in which it has a non-locking release lever to a second configuration in which it includes a locking release lever, the method comprising:

removing the non-locking release lever from the bicycle rack at least in part by removing the non-locking release lever from the ratcheting mechanism; and attaching the locking release lever to the ratcheting mechanism of the bicycle rack, wherein the locking release lever, when attached to the ratcheting mechanism, includes at least:

an anchor that is fixedly secured to the ratcheting mechanism of the bicycle rack;

a swing lever with a first end and a second end, the first end being at least one of connected with or integral with the anchor, the swing lever configured to be swung between a first position which causes to the ratcheting mechanism to be engaged and a second position which causes the ratcheting mechanism to be disengaged; and a lock at least one of connected with or integral with the second end of the swing lever, the lock including a bolt, the lock configured for being locked when the swing lever is in the first position, the bolt of the locked lock extending from the lock and preventing the swing lever from moving into the second position and disengaging the ratchet mechanism.

Embodiment 18: The method of embodiment 17, wherein the attaching the locking release lever to the ratcheting mechanism of the bicycle rack comprises:

attaching the anchor of the locking release lever to the ratcheting mechanism at least in part with one or more tamper-proof securing devices.

Embodiment 19: A locking release lever for at least one of engaging or disengaging a ratcheting mechanism of a bicycle rack, the ratcheting mechanism configured for securing a bicycle on the bicycle rack when engaged and for freeing the bicycle when disengaged, the locking release lever comprising:

an anchor that is fixedly secured to the ratcheting mechanism of the bicycle rack;

a swing lever with a first end and a second end, the first end being at least one of connected with or integral with the anchor, the swing lever configured to be swung between a first position which causes to the ratcheting mechanism to be engaged and a second position which causes the ratcheting mechanism to be disengaged; and a lock at least one of connected with or integral with the second end of the swing lever, the lock including a bolt, the lock configured for being locked when the swing lever is in the first position, the bolt of the locked lock extending from the lock and preventing the swing lever from moving into the second position and disengaging the ratchet mechanism; and wherein when the ratcheting mechanism is disengaged one or more movements of one or more holding arms associated with the bicycle rack are restricted to movement in one direction and wherein when the ratcheting mechanism is disengaged the one or more movements of the one or more holding arms associated with the bicycle rack are freed for movement in at least two directions.

Embodiment 20: The locking release lever of embodiment 19, wherein the swing lever is configured, when moved into the first position, to at least one of cause or allow a pin associated with the ratcheting mechanism to engage one or more teeth of a ratcheting arm that is associated with the ratcheting mechanism; and wherein the swing lever is further configured, when moved into the second position, to cause the pin to at least partially disengage from the one or more teeth.

It will be understood by those skilled in the art that the terminology used in this specification and in the claims is "open" in the sense that the terminology is open to additional elements not enumerated. For example, the words "includes" should be interpreted to mean "including at least" and so on. In addition, articles such as "a" or "the" should be interpreted as not referring to a specific number, such as one, unless explicitly indicated. At times a convention of "at least one of A, B, or C" is used, the intent is that this language includes all combinations of A, B, or C, including without limitation any of A alone, B alone, C alone, A and B, B and C, A and C, all of A, B, and C, A BB and C, and so on. The same is indicated by the conventions "one of more of A, B, or C." Similarly, the phrase "A, B, and/or C" is intended to include all combinations of A, B, or C, including without limitation, any of A alone, B alone, C alone, A and B, B and C, A and C, all of A, B, and C, A, BB, and C, and so on. With parentheticals such as (e.g. A, B, C). It is intended that this refer to any or all of A alone, B alone, or C alone and to any combination thereof that is applicable in the particular context.

The above description of various embodiments is intended to be illustrative not exhaustive and is not intended to limit this disclosure, its application, or uses. Those skilled in the art will be able to imagine embodiments not described but that are consistent with the principles and teachings described herein. Therefore, the above description of exemplary embodiments is not intended to limit the scope of this disclosure, which should be defined only in accordance with the following claims and equivalents thereof.

I claim:

1. A locking release lever, the locking release lever being one of one or more locking release levers that are configured for at least one of engaging or disengaging a one or more ratcheting mechanisms of a bicycle rack, the one or more ratcheting mechanisms configured for securing a bicycle on the bicycle rack when engaged and for freeing the bicycle when disengaged, the locking release lever comprising:
   an anchor that is fixedly secured to a given ratcheting mechanism of the one or more ratcheting mechanisms of the bicycle rack;
   a swing lever with a first end and a second end, the first end being at least one of connected with or integral with the anchor, the swing lever configured to be swung between a first position which causes to the given ratcheting mechanism to be engaged and a second position which causes the given ratcheting mechanism to be disengaged; and
   a lock at least one of connected with or integral with the second end of the swing lever, the lock including a bolt, the lock configured for being locked when the swing lever is in the first position, the bolt of the locked lock extending from the lock and preventing the swing lever from moving into the second position and disengaging the given ratcheting mechanism.

2. The locking release lever of claim 1, wherein when the swing lever engages the given ratcheting mechanism one or more movements of a holding arm associated with the given ratcheting mechanism are restricted to movement in one direction and wherein when the swing lever disengages the ratcheting mechanism the one or more movements of the holding arm are freed for movement in at least two directions.

3. The locking release lever of claim 1,
   wherein the swing lever is configured, when moved into the first position, to at least one of cause or allow a pin associated with the given ratcheting mechanism to engage one or more teeth of a ratchet arm that is associated with the given ratcheting mechanism; and
   wherein the swing lever is further configured, when moved into the second position, to cause the pin to at least partially disengage from the one or more teeth.

4. The locking release lever of claim 3, wherein the anchor is fixedly secured to a frame of the given ratcheting mechanism; and
   wherein the swing lever is configured, when moved into the first position, to at least one of cause or allow a longitudinal axis associated with the frame to be at a bias angle relative to an at least substantially vertical axis, and wherein placing the longitudinal axis associated with the frame in the bias angle moves the pin toward engagement with the teeth, and wherein the at least substantially vertical axis is at least substantially perpendicular to a longitudinal axis of the ratchet arm.

5. The locking release lever of claim 4, wherein the swing lever is configured, when moved into the first position, to allow a bias spring to bias the frame into the bias angle.

6. The locking release lever of claim 3, wherein the anchor is fixedly secured to a frame of the given ratcheting mechanism; and
   wherein the swing lever is configured, when moved into the second position, to cause a longitudinal axis associated with the frame at be in at least substantially vertical orientation and wherein placing the longitudinal axis associated with the frame in the at least substantially vertical orientation moves the pin away from engagement with the teeth, wherein the at least substantially vertical orientation is at least substantially perpendicular to an at least substantially horizontal axis defined by the ratchet arm.

7. The locking release lever of claim 6, wherein the swing lever is configured, when moved into the second position to overcome resistance from a bias spring that biases the frame into the bias angle.

8. The locking release lever of claim 1, wherein the lock is a camlock.

9. The locking release lever of claim 8, wherein the camlock is configured to be locked with at least a button.

10. The locking release lever of claim 1, wherein the lock is configured for being locked when the swing lever is in the first position with the bolt extended to engage a ratchet arm that is associated with the given ratcheting mechanism, the engagement of the bolt with the ratchet arm preventing the swing arm from moving to the second position to disengage the given ratcheting mechanism.

11. The locking release lever of claim 1, wherein the anchor is connected with the given ratcheting mechanism at least in part with one or more fastening devices.

12. The locking release lever of claim 11, wherein the one or more fastening devices include at least two or more tamper-proof screws.

13. The locking release lever of claim 1, wherein the anchor is connected with the given ratcheting mechanism by being integral with the given ratcheting mechanism.

14. The locking release lever of claim 1, wherein the swing lever is substantially straight between the first end and the second end.

15. The locking release lever of claim 1, wherein the swing lever with a first end and a second end, the first end being at least one of connected with or integral with the anchor, the swing lever configured to be swung between a first position which causes to the given ratcheting mechanism to be engaged and a second position which causes the given ratcheting mechanism to be disengaged comprises:
   wherein when the one or more ratcheting mechanisms are engaged one or more holding arms associated with the bicycle rack are prevented from being moved out of a closed position which secures the bicycle to the bicycle rack; and
   wherein when the one or more ratcheting mechanisms are disengaged the one or more holding arms are freed for movement out of the closed position and to an open position in which the bicycle may be removed from the bicycle rack.

16. The locking release lever of claim 1, wherein the first end of the swing lever is connected with the ratcheting mechanism of a bicycle rack that is a 1UP bicycle rack produced by 1UP USA®.

17. A method of converting one or more ratcheting mechanisms of a bicycle rack from a first configuration in which the one or more ratcheting mechanisms are associated with one or more non-locking release levers to a second configuration in which it the one or more ratcheting mechanisms are associated with one or more locking release levers, the method comprising:
   removing the one or more non-locking release levers from the bicycle rack at least in part by removing the one or more non-locking release levers from the one or more ratcheting mechanisms; and
   attaching the one or more locking release levers to the one or more ratcheting mechanisms of the bicycle rack, wherein a given locking release lever of the one or more locking release levers, when attached to the ratcheting mechanism, includes at least:
      an anchor that is fixedly secured to a given ratcheting mechanism of the one or more ratcheting mechanisms of the bicycle rack;
      a swing lever with a first end and a second end, the first end being at least one of connected with or integral with the anchor, the swing lever configured to be swung between a first position which causes to the given ratcheting mechanism to be engaged and a second position which causes the given ratcheting mechanism to be disengaged; and
      a lock at least one of connected with or integral with the second end of the swing lever, the lock including at least a bolt, the lock configured for being locked when the swing lever is in the first position, the bolt of the locked lock extending from the lock and preventing the swing lever from moving into the second position and disengaging the given ratcheting mechanism.

18. The method of claim 17, wherein the attaching the locking release lever to the ratcheting mechanism of the bicycle rack comprises:
   attaching the anchor of the locking release lever to the ratcheting mechanism at least in part with one or more tamper-proof securing devices.

19. A locking release lever, the locking release lever being one of one or more locking release levers configured for at least one of engaging or disengaging one or more ratcheting mechanisms of a bicycle rack, the one or more ratcheting mechanisms configured for securing a bicycle on the bicycle rack when engaged and for freeing the bicycle when disengaged, the locking release lever comprising:
   an anchor that is fixedly secured to a given ratcheting mechanism of the one or more ratcheting mechanisms of the bicycle rack;
   a swing lever with a first end and a second end, the first end being at least one of connected with or integral with the anchor, the swing lever configured to be swung between a first position which causes to the given ratcheting mechanism to be engaged and a second position which causes the given ratcheting mechanism to be disengaged; and
   a lock at least one of connected with or integral with the second end of the swing lever, the lock including a bolt, the lock configured for being locked when the swing lever is in the first position, the bolt of the locked lock extending from the lock and preventing the swing lever from moving into the second position and disengaging the the ratcheting mechanism; and
   wherein when the one or more ratcheting mechanisms are disengaged one or more movements of one or more holding arms associated with the bicycle rack are restricted to movement in one direction and wherein when the one or more ratcheting mechanisms are disengaged the one or more movements of the one or more holding arms associated with the bicycle rack are freed for movement in at least two directions.

20. The locking release lever of claim 19,
   wherein the swing lever is configured, when moved into the first position, to at least one of cause or allow a pin associated with the given ratcheting mechanism to engage one or more teeth of a ratchet arm that is associated with the given ratcheting mechanism; and
   wherein the swing lever is further configured, when moved into the second position, to cause the pin to at least partially disengage from the one or more teeth.

* * * * *